2,459,010

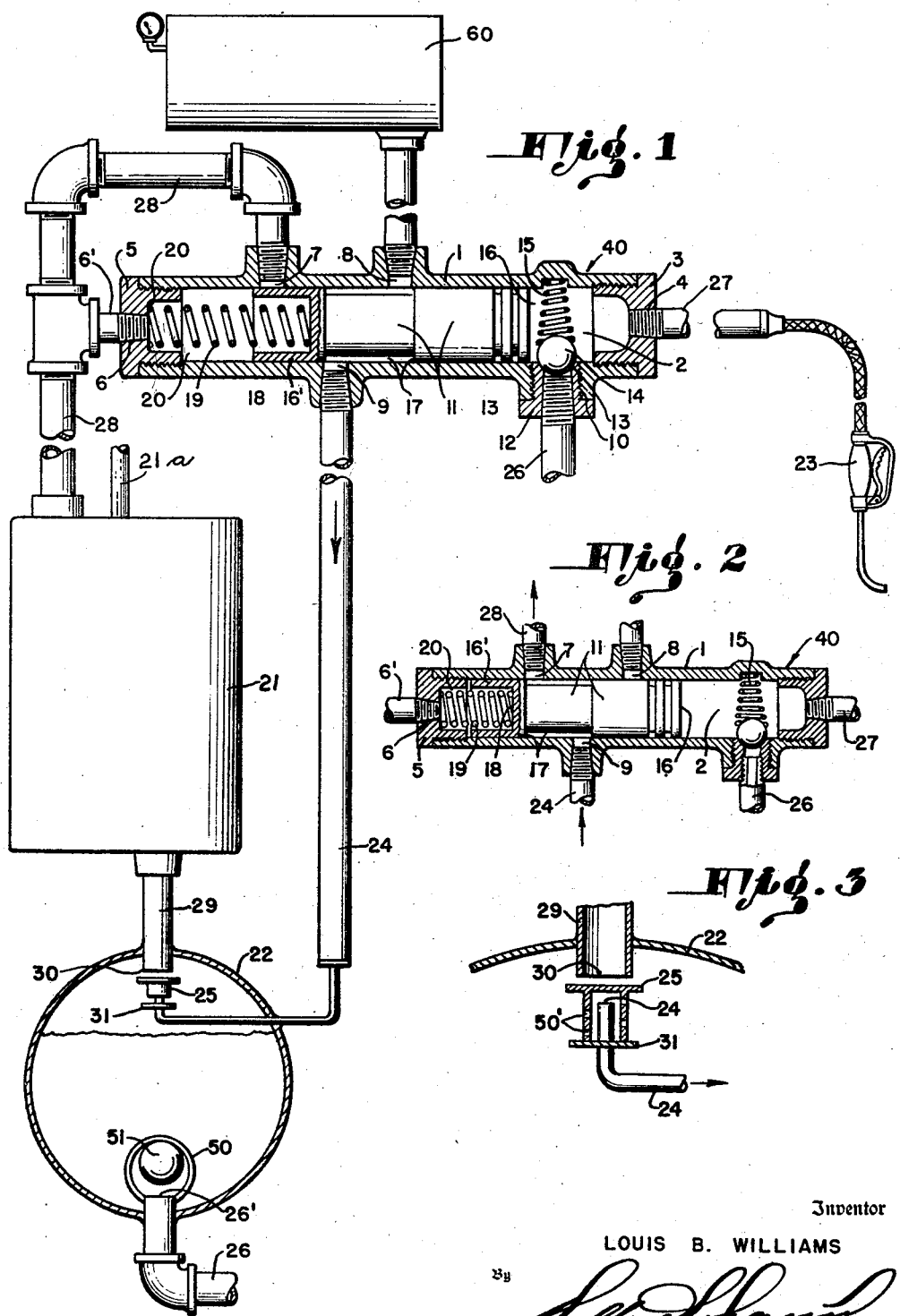
Jan. 11, 1949.     L. B. WILLIAMS     2,459,010
HIGH-PRESSURE LUBRICATING UNIT
Filed Dec. 18, 1944
Inventor
LOUIS B. WILLIAMS
By
Attorney Patented Jan. 11, 1949

UNITED STATES PATENT OFFICE 2,459,010

HIGH-PRESSURE LUBRICATING UNIT

Louis B. Williams, Los Angeles, Calif., assignor to The Garrett Corporation, Airesearch Manufacturing Company division, Los Angeles, Calif., a corporation of California Application December 18, 1944, Serial No. 568,752

2 Claims. (Cl. 222—373)

My invention relates to lubricant dispensing apparatus; and more particularly to apparatus whereby the lubricant is dispensed under pressure.

Although the apparatus of my invention may be satisfactorily employed in various fields and industries, it is of particular utility for lubricating automotive vehicles. In these vehicles, the various parts thereof are difficult to reach with a lubricant and require varying kinds of lubricants and modes of applying them, some parts requiring so-called "heavy" lubricants, which are preferably applied under pressure, and other parts necessitating the use of lighter lubricants.

It is an object of my invention to provide a lubricant-dispensing machine which will, when operated, automatically dispense lubricant under pressure through a hose having a nozzle insertable into the automotive part requiring lubrication.

It is also an object of the invention to provide a lubricant dispensing apparatus including a dispensing tank in which the dispensing tank will be automatically replenished with lubricant when lubricant is not being dispensed from the apparatus.

It is also an object of the invention to provide a lubricating apparatus including a dispensing tank for the lubricant, which tank will be subjected to high pressure for forcing lubricant out of the apparatus when a dispensing valve at the end of the dispensing hose is opened, and which tank will be automatically relieved of said pressure and connected to the replenishing tank for replenishment, when said dispensing valve is closed.

It is a further object of the invention to provide, in an apparatus of this kind, a valve which, in one position, will be connected to a source of compressed air to apply pressure to the dispensing tank by the opening of said hose valve, and thereby effectuate dispensing of the lubricant through said hose valve, and which, in its other position, will automatically effectuate replenishment of the dispensing tank.

It is another object of the invention to provide, in a lubricating apparatus, a main valve unit operationally interposed between the valve on the hose end, and connected to the two tanks, and adapted to be held by lubricant in two hydraulically-locked positions, one for the supplying of compressed air to the dispensing tank when the dispensing valve is open, and the other position being for venting used air from the dispensing tank and for effectuating replenishing of said dispensing tank from the replenishing tank.

It is a still further object of the invention to provide, in the flow connection between the replenishing tank and the dispensing tank, a valve member which will be responsive respectively, to low air pressure and to high air pressure in the dispensing tank, to thereby respectively open and close said flow connection between the two tanks.

Still another object of the invention is to provide a lubricating apparatus which will have relatively high capacity for heavy lubricants such as grease, for example, yet will, due to the foregoing novel features, be unitary and compact in nature.

The other objects, advantages and accomplishments of the invention will become self-evident as this disclosure proceeds.

The presently preferred embodiment of the invention is illustrated, for purposes of exemplification only, in the accompanying drawings and described hereinafter in conjunction therewith, it being understood that the inventive concepts are limited in their embodiments, only by the scope of the accompanying claims.

In the drawings:

Fig. 1 is a more or less diagrammatic view of the lubricating apparatus, showing some parts in section, and showing other parts in elevation, and with the moving parts in one set of positions;

Fig. 2 is a substantially central, longitudinal section of the main valve member of Fig. 1, in a different operational position; and Fig. 3 is a detailed vertical section, on a somewhat enlarged scale, of another member shown in Fig. 1, in a different operational position.

Referring to the accompanying drawings by reference numerals, in which similar numerals designate similar parts in all the views, the drawings show a lubricating apparatus in the form of a compact unit. This unit includes a low pressure tank 21 for the lubricant, arranged above, and connected to, a high pressure tank 22, from which latter, on occasion, lubricant is forced, by compressed air, to a lubricant dispensing valve 23, by way of a member 40. Valve 23 may be one of the ordinary lubricant dispensing valves found on the market, and hence its detailed construction need not be described here.

The quantity of lubricant in tank 21 is not maintained absolutely constant, but is adapted, by means of a filler spout or the like (not shown) to be filled from time to time with the necessary amount of lubricant and the tank 21 has a vent 21a leading to atmosphere. Tank 22, however, is adapted to be automatically replenished with lubricant, between dispensings from nozzle 23, and hence, on the average, the quantity of lubricant in tank 22 remains substantially constant.

The member 40 is essentially a piston type valve and includes a hollow, elongated body 1, preferably cylindrical in shape and closed at each end. The right-hand end, as shown in Fig. 1, is closed by a threaded cap 3, adapted to engage corresponding threads on the interior of the body 1. The cap 3 has an outlet opening 4 into which is fitted a dispensing hose 27, at the far end of which is the actual dispensing valve 23. The other end of the hollow cylinder is also closed by a cap member 5, similarly threadedly attached to the body 1, and having an opening 6 to which is attached a hose or fitting 6'.

In the body 1, near one end of the upper side thereof, there is formed an opening 7, and near the center of the upper side of the cylinder is formed another opening 8. The lower wall of the body is provided with an aperture 9, near its center, and the right hand end of the lower wall of the body 1 is provided with an opening 10. The aperture 10 is provided with an externally and internally threaded fitting 12.

A reciprocatable piston 11 is fitted into the bore of the body 1, and is provided at one end with a head 16 and at the other, with a skirt 16'. The piston 11 is adapted to take up various positions in the cylinder under the influence of lubricant pressure in chamber 2 and against the reaction of a helically coiled spring 19 seated at one end against the piston and at the other against a seat in the cap 5.

A one-way valve, here shown as including a phere 14, resting in a seat 13 in the cap 12 in the aperture 10, is provided near the right hand end or dispensing end of the cylinder and is held on the seat, in a normally closed position, by means of the helically coiled spring 15.

The piston 11 is provided near its skirt with an annular groove 17 extending entirely around its periphery. The opening 8 is provided with an inlet fitting for the admission of air under pressure from an air compressor 60 and the annular groove is adapted to register in one of its positions with the opening 8 and with the opening 9 in the body.

A conduit 24 is attached by its upper end in the opening 9 and its lower end terminates within the pressure cylinder 22. A conduit 28 is fitted to the opening 7 and leads therefrom to the upper part of the supply tank 21. With the piston occupying the position shown in Fig. 1, entrance to the pipe 28 is blocked by the skirt 16' of the piston. A conduit 29 leading from the supply tank 21 to the pressure tank 22 has an entrance opening 30, adapted to be closed by a valve member 25 mounted around the upper end of pipe 24, in one position of the valve. In the other position of the valve 25, it is seatable on a flange 31 on the pipe 24.

The lubricant in tank 22 is maintained at a level just below the bottom of valve 25. The lower portion of the tank 22 is provided with an outlet 26'. The outlet 26' is surrounded by a float valve housing 50. In this housing 50 is mounted a float valve 51, adapted to close the opening 26', on occasion. The conduit 26 leads upwardly into the opening 10, and this connects with the chamber 2 of body 1.

In use, when the valve 23 is opened and the piston 11 takes up the position shown in Fig. 1, the compressed air enters cylinder 1 through opening 8. The valve 14 remains closed until lubricant reaches it from tank 22, and opening 7 is obstructed by the skirt of the piston 11. The compressed air hence passes into body 1, around the annular groove 17 and out of the opening 9. From opening 9, the air is forced downwardly through conduit 24.

The lower portion of conduit 24 is angled upwardly, as best seen in Fig. 3, and extends into proximity with the inside face of cup valve 25. Thus, the air emerging from pipe 24 forces the upper, outer face of cup valve 25 into fluid-tight contact with opening 30. This compressed air hence is prevented from entering tank 21 and therefore exerts its full force upon the upper surface of the lubricant body in tank 22. As a consequence, lubricant is forced downwardly out of the valve arrangement 50, 51, in the bottom of tank 22, into conduit 26, and upwardly therein into the opening 10 in chamber 2. The spring 15 being in proper adjustment, the rising lubricant will unseat the ball valve 13 and force its way out the dispensing hose 27, through the valve 23, and to the particular spot to be lubricated on the adjacent automobile or other vehicle.

When the valve 23 is in the closed position, however, a hydaulic lock is formed in the chamber 2 of cylinder 1, as shown in Fig. 2, forcing piston 11 leftwardly into the position shown in Fig. 2. In this position the piston 11 closes off the opening 8 and opens the outlet 7 to the outlet 9 through the annular groove 17. Hence, the charge of air previously supplied to, and still contained in, chamber 22, after forcing the desired quantity of lubricant out of valve 23, is provided with an upward escape path, into tank 21. In order to establish this flow of air, the valve 25, no longer subjected to pressure from pipe 24, drops to rest on the flange 31. The air in the top of cylinder 22 then enters the pipe 24 through the apertures 50' provided in the side walls of the valve 25. This air now backtracks upwardly through pipe 24, through opening 9, around the peripheral groove 17, out of the opening 7, through the conduit 28 and into the top of the supply tank 21. This arrangement provides means for preventing any lubricant in the air valve from being spewed out into the atmosphere. The supply tank has a vent leading to atmosphere, and not requiring the presence of air therein, most of this used air vents ultimately to atmosphere.

A hose or fitting 6', connected to the conduit 28 where it leads downwardly into the supply tank, is adapted to drain a chamber 20 in body 1 of any lubricant or air that has managed to bypass piston 11, to thereby prevent the formation of a hydraulic lock in chamber 20. It conducts this mixture into the supply tank 21 and thereby also serves to aid in maintaining the total amount of lubricant in the system at a substantially constant value.

As shown in Fig. 3, when the valve 25 is in its lowermost position, resting on flange 31, the opening 30 from the supply tank is unobstructed, and hence, until uplifting air pressure is put upon valve 25 again, tank 22 will receive make-up lubricant from tank 21.

If desired, the entire unit may be mounted upon a small base; or be suspended from wall brackets in any convenient location in a filling station or the like, the device being shown herein diagrammatically without such adjuncts merely to present one of the presently preferred embodiments of the inventive principles. Other refinements and ramifications of the illustrated embodiment are contemplated as being within the present inventive concepts, and all lie within the scope of the following claims.

Moreover, in addition to the illustrative embodiment herein set forth, the invention contemplates the provision of many other embodiments of a somewhat different construction, but nonetheless embodying the present inventive principles.

What I claim as new, and of my invention, is:

1. In a compressed air type lubricant dispensing apparatus of the character described: a valve unit including a substantially hollow cylinder, substantially closed at each end; a piston movable therein into two operative positions; a spring interposed between one end of the piston and the adjacent end of the cylinder to hold said piston in one of said positions; said cylinder having an aperture for the inlet of compressed air and having compressed air outlet apertures on opposite sides of the cylinder for transmitting compressed air successively in two directions; an inlet in the cylinder for the admission of lubricant to be dispensed under pressure and to hold said piston in the other of said positions, the piston having an annular groove for connecting the compressed air inlet aperture with the compressed air outlet aperture in the spring biased position of the piston, and adapted to connect the compressed air outlet aperture on the one side of the cylinder with the compressed air outlet on the opposite side of the cylinder in the lubricant biased position of the piston; and an outlet in one end of the cylinder for the discharge of lubricant under pressure when said piston is in the spring biased position in said cylinder.

2. In an apparatus for dispensing lubricant therefrom under the influence of compressed air: a high pressure chamber for lubricant to be dispensed; a valve, including a casing and a piston movable in said casing, said piston having a head, a skirt, and an annular groove intermediate the head and the skirt and said casing having a lubricant dispensing aperture therein at one end, an aperture on the upper side for the admission of compressed air, another aperture on the same side for the exhaust of used air, an aperture on the opposite side for both the passage outward therethrough of dispensing effectuating air and the entrance inwardly of used air, and an aperture on the last mentioned side adjacent the lubricant dispensing aperture for the admission of lubricant to be dispensed; a conduit connecting the forth mentioned aperture with the high pressure chamber; a conduit connecting said high pressure chamber with the lubricant admission aperture of the casing; a one-way valve for controlling said lubricant admission aperture to provide a hydraulic lock when air pressure is relieved in the high pressure chamber; the apertures for the flow of air being so arranged that when said piston is in one position the annular groove connects the compressed air admission aperture with the forth mentioned aperture while the skirt simultaneously obstructs the used air exhaust aperture to thereby prevent short circuiting of the compressed air through the second mentioned aperture and when said piston is in another position in said casing the annular groove connects said forth mentioned aperture with the aperture for the exhaust of used air with the head of the piston simultaneously obstructing the compressed air inlet aperture; and yielding means for moving said piston into the first mentioned position.

LOUIS B. WILLIAMS.

REFERENCES CITED

The following references are of record in the file of this patent:

UNITED STATES PATENTS

| Number | Name | Date |
|---|---|---|
| 1,316,557 | Bowser | Sept. 23, 1919 |
| 1,586,770 | Badoux | June 1, 1926 |
| 1,969,404 | Hunter | Aug. 7, 1937 |
| 2,101,468 | Dale | Dec. 7, 1937 |
| 2,118,381 | Hunter | May 24, 1938 |
| 2,282,188 | Horne | May 5, 1942 |